US009243610B2

(12) United States Patent
Degala (10) Patent No.: US 9,243,610 B2
(45) Date of Patent: Jan. 26, 2016

(54) FLUID POWERED TURBINE

(71) Applicant: FUNNELHEAD LIMITED, Nottingham (GB)

(72) Inventor: Rajeshwar Rao Degala, Woodthorpe (GB)

(73) Assignee: Funnelhead Limited, Nottingham (GB)

( * ) Notice: Subject to any disclaimer, the term of this patent is extended or adjusted under 35 U.S.C. 154(b) by 0 days.

(21) Appl. No.: 14/348,776

(22) PCT Filed: Oct. 15, 2012

(86) PCT No.: PCT/GB2012/052549
§ 371 (c)(1),
(2) Date: Mar. 31, 2014

(87) PCT Pub. No.: WO2013/054140
PCT Pub. Date: Apr. 18, 2013

(65) Prior Publication Data
US 2014/0241873 A1    Aug. 28, 2014

(30) Foreign Application Priority Data

Oct. 14, 2011  (GB) .................................. 1117758.1

(51) Int. Cl.
*F03D 1/04*        (2006.01)
(52) U.S. Cl.
CPC ............. *F03D 1/04* (2013.01); *F05B 2240/131* (2013.01); *Y02E 10/28* (2013.01); *Y02E 10/72* (2013.01)
(58) Field of Classification Search
CPC ......... F03D 1/04; F03D 3/0418; Y02E 10/72; F05B 2240/131
USPC ......... 415/4.2, 4.4, 147, 220, 907; 290/44, 55
See application file for complete search history.

(56) References Cited

U.S. PATENT DOCUMENTS 7,118,344 B2 * 10/2006 Wieser .......................... 416/189
8,207,625 B1 *  6/2012 Cristo ............................ 290/55
(Continued)

FOREIGN PATENT DOCUMENTS

FR      529301       11/1921
FR     2476761     *  8/1981    ................ F03D 3/04
(Continued)

OTHER PUBLICATIONS

International Patent Application No. PCT/GB2012/052549, International Search Report and Written Opinion mailed Mar. 12, 2013, 11 pages.
(Continued)

*Primary Examiner* — Edward Look
*Assistant Examiner* — Juan G Flores
(74) *Attorney, Agent, or Firm* — Kilpatrick Townsend & Stockton LLP (57) ABSTRACT

A fluid powered turbine, such as a wind turbine (10), has a hollow column (12) in which a rotating turbine is housed. A fluid directing structure (14) is supported at or near an end of the column (12) remote from the turbine. The fluid directing structure (14) has a plurality of individual inlet openings (26) spaced around its periphery and is arranged to direct air at each inlet opening into an inner pipe (18). The incoming air is constricted both within the structure (14) and as it exits the column (12) whereby its speed is sufficient to rotate the turbine (20). The structure at the top of the column (12) generally requires no maintenance and maintenance of the turbine (20) is considerably easier than with traditional wind generators as access is easy. As the turbine is enclosed, it is safer than the traditional wind generators and less noisy.

15 Claims, 9 Drawing Sheets

(56) References Cited

U.S. PATENT DOCUMENTS

| | | | |
|---|---|---|---|
| 2003/0156938 A1 | 8/2003 | Verini | |
| 2010/0278629 A1* | 11/2010 | Krippene | 415/1 |
| 2011/0280707 A1* | 11/2011 | Iskrenovic | 415/4.2 |
| 2011/0316279 A1* | 12/2011 | Bahari et al. | 290/44 |

FOREIGN PATENT DOCUMENTS

| | | | |
|---|---|---|---|
| GB | 2459499 | 10/2009 | |
| GB | 2459499 A * | 10/2009 | Y02E 10/74 |
| JP | 61085588 | 5/1986 | |
| JP | H0579448 | 3/1993 | |
| JP | H0688565 | 3/1994 | |
| JP | H07217231 | 8/1995 | |
| NL | 8401539 | 12/1985 | |

OTHER PUBLICATIONS

Japanese Application No. 2014-535168, Office Action issued Sep. 2, 2014, 7 pages.

* cited by examiner

Cross Sections

Funnel Layer

Fig. 8a

Exhaust Layer

FLUID POWERED TURBINE

CROSS-REFERENCE TO RELATED APPLICATIONS

This is the U.S. national phase of International Application No. PCT/GB2012/052549 filed on Oct. 15, 2012 and published in English on Apr. 18, 2013 as International Publication No. WO 2013/054140 A1, which application claims priority to Great Britain Patent Application No. 1117758.1 filed on Oct. 14, 2011 the contents of both of which are incorporated herein by reference.

The present invention relates to a fluid directing structure for a fluid powered turbine and to a fluid powered turbine.

In recent times there has been much more emphasis on ways of turning natural power, such as wind power and wave power, into useful work. In particular, wind farms having a large collection of wind turbines have become almost commonplace. However, the currently used wind generators are expensive, noisy and inefficient. The most well known wind generator has a tall tower supporting, near its top, a housing for a turbine and generator, and has two or more blades affixed to a rotating hub or shaft of the generator. There is noise from the blades passing through the air and there is noise from the generator itself.

The commonplace wind generators also have to be aligned so that the wind can rotate the blades and often they require electrical power in order to start. Furthermore, as the turbine and generator is mounted at the top of a tall tower, maintenance is difficult.

It is an object of the present invention to provide a fluid powered turbine which improves on those currently available.

According to a first aspect of the present invention there is provided a fluid powered turbine comprising:

an elongate, hollow pipe, a rotatable turbine, operable by fluid flow, housed within the hollow pipe at or near a first end thereof, and a fluid directing structure affixed to the pipe at or near its second end spaced from the first end, wherein there is at least one fluid flow conduit extending within the pipe and connecting the fluid directing structure with the rotatable turbine such that fluid flow within the directing structure can be directed to the rotatable turbine to operate the rotatable turbine, and wherein the fluid directing structure has a plurality of individual inlet openings spaced around its periphery, and means to direct fluid at each inlet opening to a fluid outlet in communication with said fluid flow conduit.

A fluid powered turbine of embodiments of the invention may be used, for example, as a wind turbine. Unlike commonplace wind generators, there are no external moving parts. Furthermore, as the fluid directing structure has individual inlet openings spaced around its periphery, wind or other fluid can be gathered and directed irrespective of the direction from which it arrives.

In the context of a wind turbine, the hollow pipe may be in the form of an upstanding hollow column and the rotatable turbine will be housed within the column towards its base. In this embodiment, the rotatable turbine will generally be a vertical axis turbine having generally horizontally extending blades. As the rotatable turbine is within the column it is in a controlled environment.

In an embodiment, said means to direct fluid at each inlet opening of the fluid directing structure comprise a plurality of funnels spaced around the fluid directing structure and each having a mouth forming a respective inlet opening, wherein a respective outlet pipe is attached to each funnel, the outlet of each outlet pipe communicating with said fluid flow conduit, and wherein said fluid flow conduit is an inner, hollow pipe extending within the elongate hollow pipe generally coaxially therewith.

Preferably, the rotatable turbine incorporates a generator for generating electricity.

Alternatively, the rotatable turbine may be arranged to provide motive power to milling stones, or to a pump, or to other engines.

Preferably, the fluid directing structure is arranged to draw fluid into the fluid flow conduit and to increase the speed of the fluid directed to the rotatable turbine.

Furthermore, the fluid directed to the rotatable turbine is constrained to flow within the pipe back towards the fluid directing structure after exiting the turbine and then to exit the fluid directing structure, the exiting of the fluid from the turbine being arranged to increase the mass flow rate of the fluid.

In embodiments of a turbine of the invention, the turbine has a vertical axis and the fluid flow is directed downwardly onto generally horizontally extending blades. All of the blades are therefore driven by the fluid flow for increased efficiency.

The arrangement is such as to focus the fluid flow and increase its speed over the turbine. The turbine can have a relatively large power, whilst the swept area can be kept small to increase efficiency.

The shaping of the fluid directing structure, and other arrangements to control the fluid flow, can be chosen as required to improve the performance of the turbine.

In an embodiment, each inlet structure is a funnel with its mouth forming the inlet opening, and a respective outlet pipe is attached to the outlet of each funnel. All of the outlet pipes of all of the funnels are adjacent and substantially parallel.

In use, the adjacent outlet pipes will be arranged such that they all communicate with the interior of the pipe or column.

In an embodiment, a movable flap is attached to each funnel at or near its outlet. Preferably, the arrangement is such that each movable flap generally closes the respective outlet under the force of gravity.

The movable flaps close the outlets of funnels through which there is no incoming fluid flow to ensure that exiting fluid flow can be appropriately directed.

Preferably, the housing comprises a frame formed to define the inlet openings, the frame having a roof carried thereby, the roof being shaped to direct air flow.

If required, solar panels may be carried by the roof of the housing.

In an embodiment, the frame comprises a top and a bottom joined by upstanding struts, wherein pairs of adjacent struts define an inlet opening therebetween.

In one embodiment, pairs of inlet openings defining struts define gaps in the frame. These gaps communicate with the pipe and thus form exhausts for fluid exiting the fluid directing structure. Thus, in this arrangement, inlet openings and gaps are arranged alternately around the periphery of the fluid directing structure.

In an alternative embodiment, the frame is extended and exhaust openings communicating with the pipe extend around the periphery of the frame extension. Thus, for example, the frame extension comprising a plurality of adjacent exhaust openings arranged around its periphery may be arranged above or below the frame having a plurality of adjacent inlet openings arranged around its periphery.

Movable flaps are preferably mounted to close the gaps so that exiting fluid flow can be directed as required. These flaps also are preferably closed under the force of gravity.

Preferably, an air flow stabiliser plate is supported below the frame. Alternatively, an air flow stabiliser plate may be supported above the frame. In this arrangement the air flow stabiliser plate may form the roof or may replace the roof.

Embodiments of the present invention will hereinafter be described, by way of example, with reference to the accompanying drawings, in which:

FIG. 5b shows a horizontal section of the funnel of FIG. 5a;

The invention will be described herein with specific reference to a wind generator, that is, to a wind powered turbine incorporating a rotatable turbine and generator and arranged to generate electricity from wind power. However, a wind turbine as described and illustrated may, alternatively, utilise wind power to do useful work in other ways. Thus, and as is well known, in the case of windmills and similar, the rotatable turbine, instead of powering a generator to generate electricity, may do mechanical work such as providing motive power to milling stones or to a pump or other engines.

What is more, the invention is described as a wind generator arranged to have its hollow pipe extending substantially vertically so that the fluid directing structure is at the top and the rotatable turbine is towards the base of the pipe which is in the form of a column or tower. However, the hollow pipe may be arranged in other orientations, for example, horizontally, or it may have a bend or other change of direction along its length.

Hollow pipes extending in directions other than the vertical may be used, for example, for wind turbines to be supported on buildings. In an embodiment, where the fluid directing structure is supported on, or in proximity to, the roof or top of a building, the hollow pipe may extend through the building, for example, through a lift shaft or stairwell. The rotatable turbine would be appropriately located within the hollow pipe.

Of course, wind, which is generally currents of air, is only one fluid from which renewable energy might be obtained, and any other fluids may be utilised. The most obvious alternative is water or wave power and the principles described herein could be used in such environments.

Figure 1:
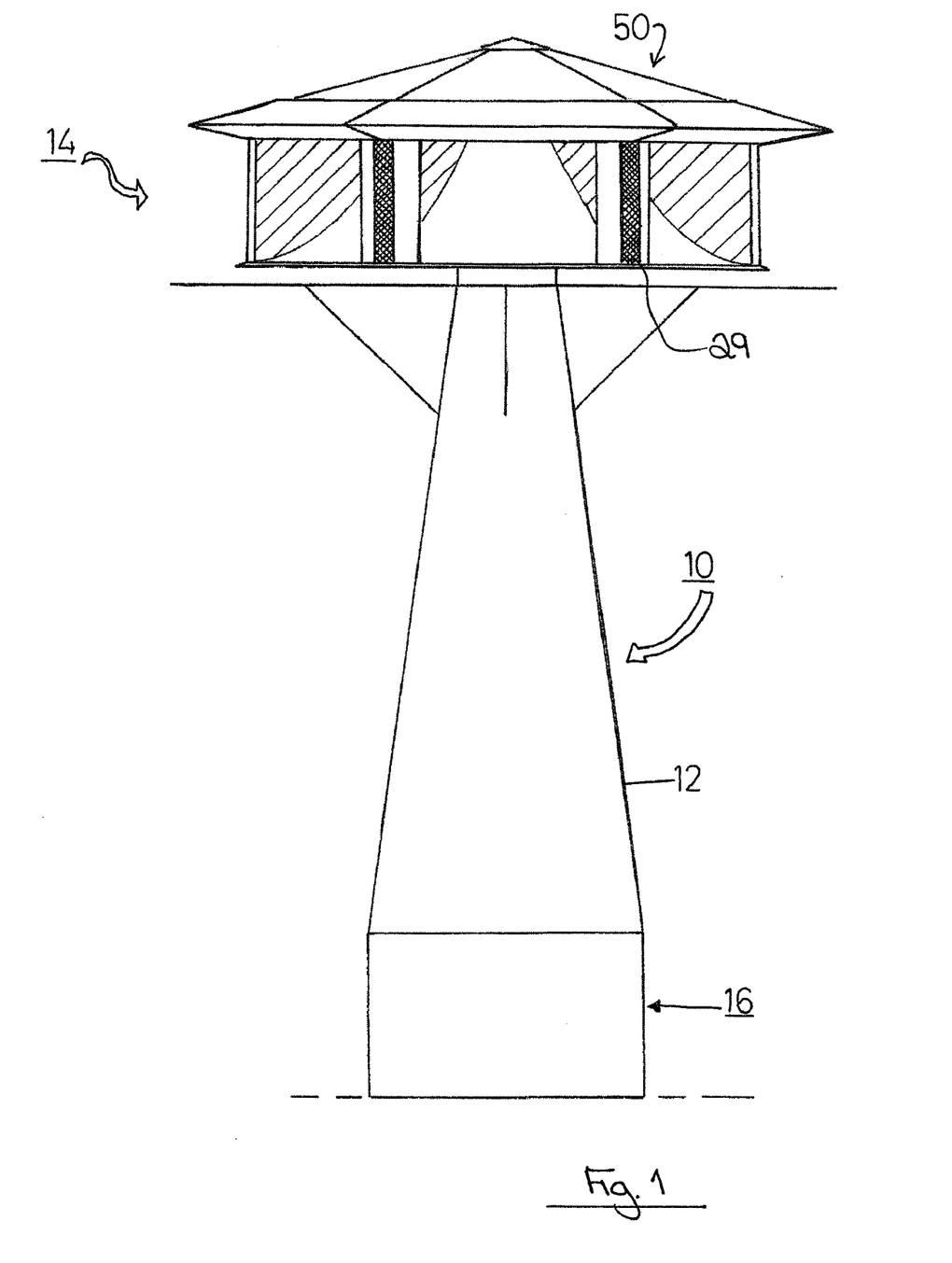
FIG. 1 shows schematically a perspective view of a wind turbine in accordance with an embodiment of the invention.

FIG. 1 shows schematically a wind turbine 10 according to an embodiment of the present invention. As can be seen the wind turbine has a upstanding hollow pipe 12 forming a column carrying a wind directing structure 14. Towards the base of the hollow column 12 there is a portion 16 which forms a turbine chamber.

Figure 2:
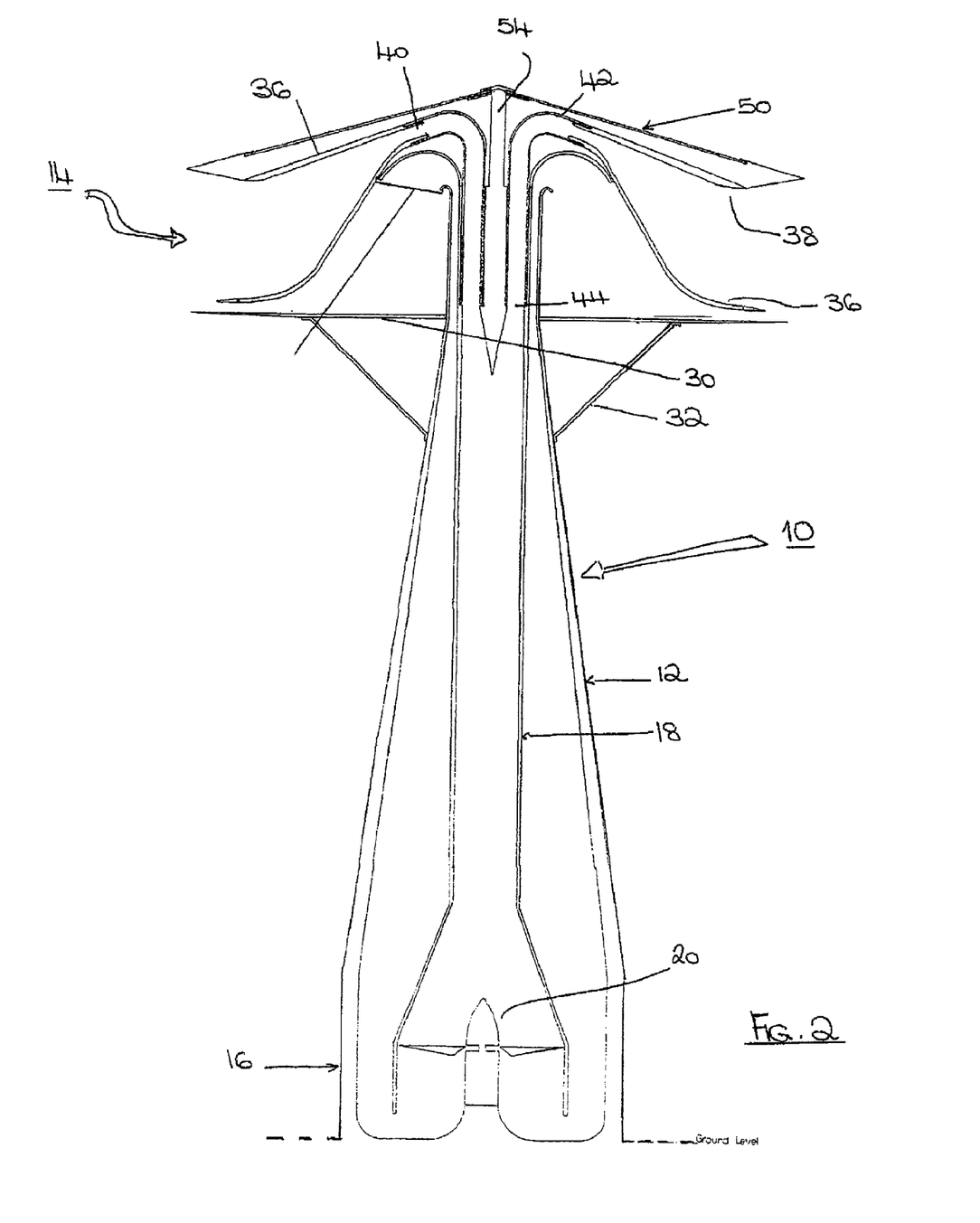
FIG. 2 shows a vertical section through the wind turbine of FIG. 1.

FIG. 2 shows a vertical section through the wind turbine 10 of FIG. 1. It will be seen that the hollow column or pipe 12 incorporates within it an inner, coaxial, hollow pipe 18. This inner pipe 18 houses a turbine 20 within its base and then extends upwardly within the column 12. The wind directing structure 14 is affixed to the column 12 and to the inner pipe 18.

Figure 4A:
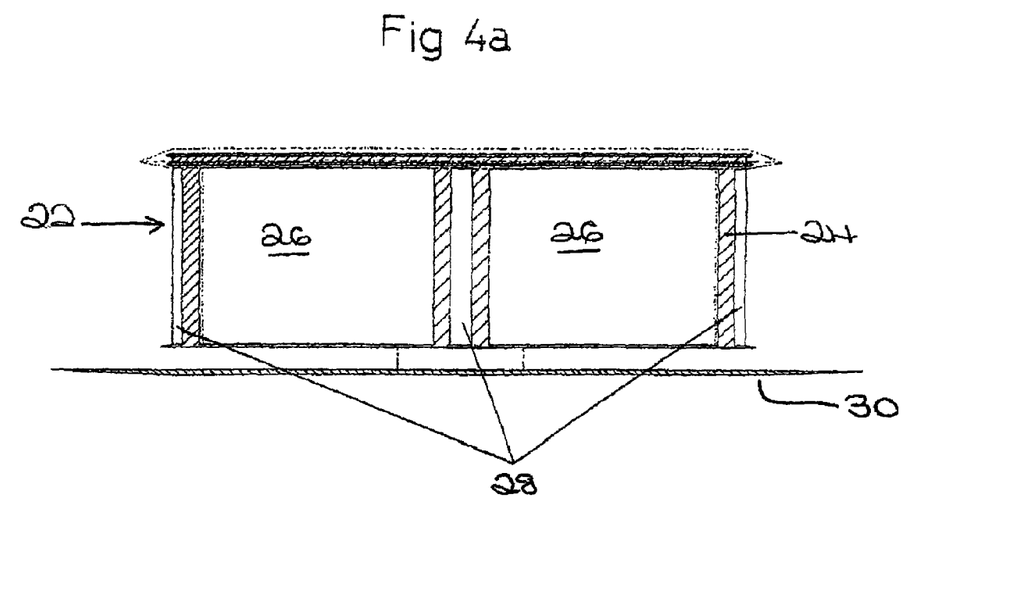
FIG. 4a shows a vertical section through a frame of a fluid directing structure.
Figure 4B:
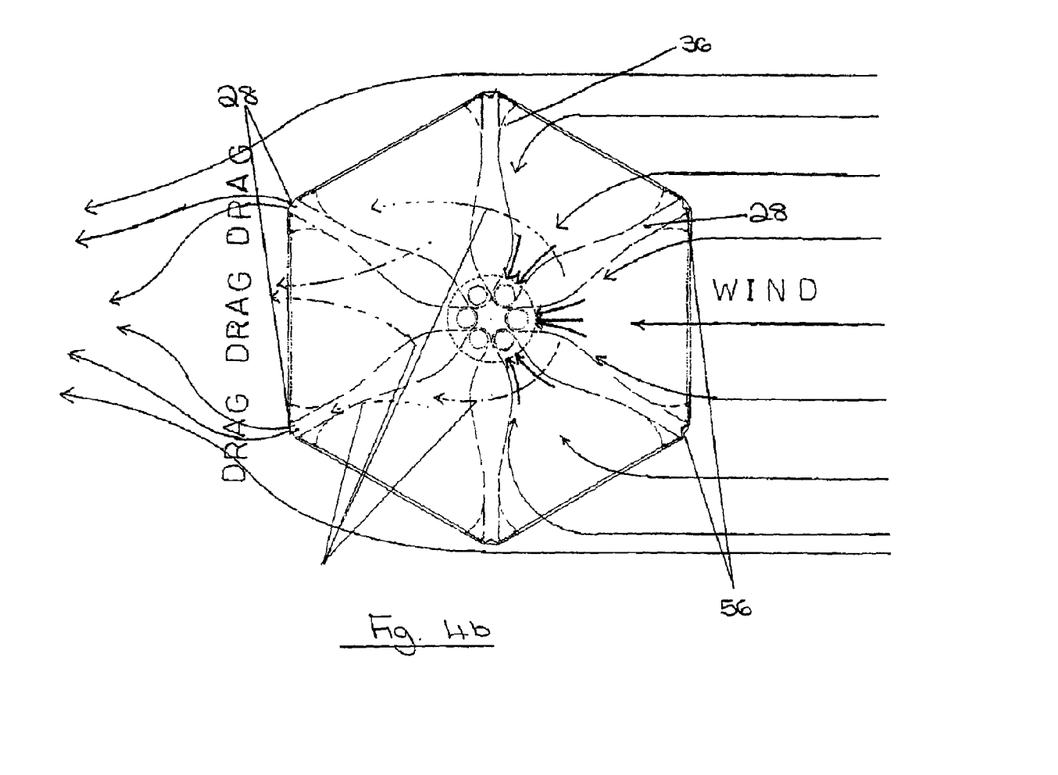
FIG. 4b shows a view from above of the frame of FIG. 4a with inserted funnels shown in outline.

As can be seen from FIGS. 4a and 4b, the wind directing structure 14 comprises a frame 22 having a top and a bottom joined by upstanding, elongate, struts 24. These struts 24 define a plurality of inlet openings 26 spaced around the periphery of the frame 22. In the embodiment illustrated, there are six such inlet openings 26. However, the wind directing structure 14 may be shaped as required to provide more or less inlet openings. As well as defining inlet openings 26, the struts 24 also define gaps 28 which, as we shall see, will provide outlets for air flow. As shown in FIG. 1, these gaps 28 may be spanned by grilles 29. As is also apparent in FIG. 4a, a plate 30, which acts as an air flow stabiliser, is affixed underneath the bottom surface of the frame 22. Brackets 32 can be provided between the air flow stabiliser 30 and the main column 12, as shown in FIGS. 1 and 2, to provide additional support for the wind directing structure 14.

The frame 22 houses six funnels 36 which are indicated in FIG. 4b and which are shown in vertical section in FIG. 2. Each funnel 36 has a mouth opening 38 which is positioned in a respective inlet opening 26 of the frame 22. Each funnel 36 is shaped to constrict to an outlet 40. In this respect, the shape of the funnels may be chosen as required to provide the performance required. As is best shown in FIG. 2, a respective outlet pipe 42 is provided for each funnel 36 and has one end affixed to the outlet 40 of the funnel 36 and then extends around an approximately 90 degree bend to terminate at a pipe outlet 44. It will be seen from FIG. 2 that the outlet pipes 42 of adjacent funnels 36 extend substantially parallel to each other, are generally adjacent, and all have their outlet 44 in communication with the interior of the inner, hollow pipe 18.

Of course, the bend in the outlet pipes 42 can be of any angle. The outlet pipes are positioned in dependence upon the orientation of the funnels and in dependence upon the orientation of the inner hollow pipe 18. The outlet pipes 42 just need to provide communication between the funnel outlets 40 and the interior of the hollow pipe 18.

As can be seen in FIGS. 1 and 2, a top or roof 50 is carried by the wind directing structure 14 above the frame. As indicated, this roof 50 can be shaped to direct wind flow.

Figure 3:
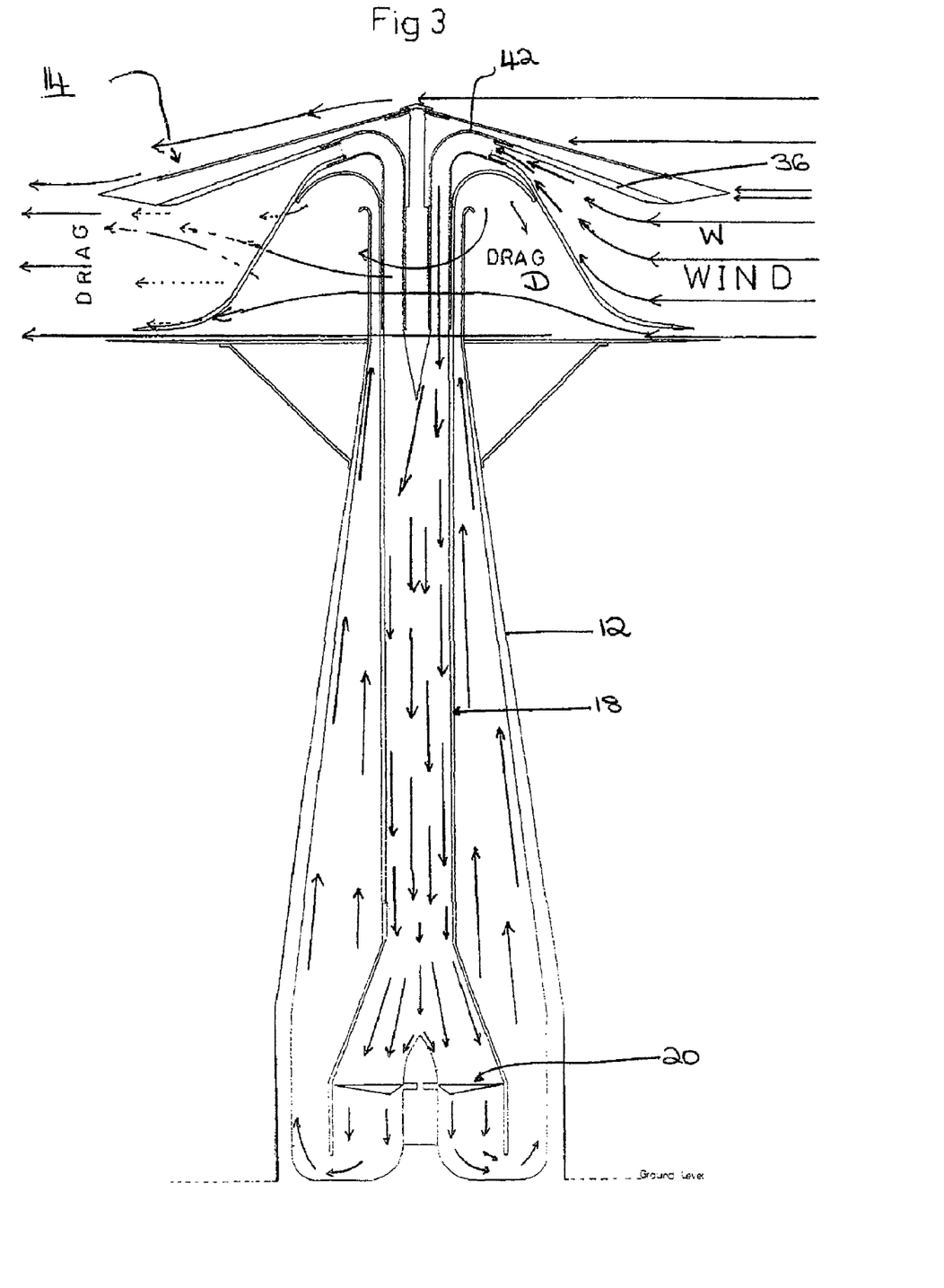
FIG. 3 shows the section of FIG. 2 illustrating wind flow.

FIG. 3 indicates the flow of air through the wind turbine 10 as described and illustrated. It will be appreciated that when the pipe or column 12 of the wind turbine 10 is erected to extend upright, and there is wind, currents of air will impinge upon the wind directing structure 14 from any direction. However, as the inlet openings 26 are spaced around the structure 14 it is likely that air will directly impinge on at least one inlet opening 26 as illustrated in FIG. 3. Thus, as shown, currents W of air arrive at the inlet 38 of at least one particular funnel 36. The funnel 36 is constricted along its length such that air flowing into the funnel 36 towards the outlet pipe 42 will have its speed increased by the venturi effect. This fast flowing air is directed into the inner pipe 18, and then flows down the inner pipe 18 to impinge upon the blades of the turbine 20, which extend generally horizontally. Having passed through the turbine 20 the air flows upwardly within the hollow column 12, but outside of the inner pipe 18, and flows back into the frame 22 of the wind directing structure 14 but externally of the funnels 36. The air exhausts from the frame 22 through the gaps 28 as indicated in FIG. 4*b*.

The air exiting the top of the column 12 is drawn out by a drag D within the frame 22 which acts to pull air W into the wind directing structure 14. The drag D is created by air flowing through the structure 14 beneath the funnels 36 but above the stabiliser plate 30. There are also drag forces created on the opposite side of the structure 14 to the inlet opening through which the air enters the system. These further drag forces also seek to pull air into the wind directing structure 14.

The actual design of the wind directing structure 14, and particularly the shape of the individual parts, can be chosen as required. Significant features of the structure are that it has no moving parts so that noise is reduced, and that it has inlet openings facing in all directions around a 360 degree periphery so that the structure is always able to receive and gather wind and direct it to the turbine.

Generally, in use, only some of the inlet openings 26 are open to allow air to enter the system and selected ones of the gaps 28 can be closed. It is required to create drag or low pressure areas to draw the wind through the structure and to increase the speed of the wind directed to the turbine. It will be appreciated that the fast flowing wind directed into the inner pipe 18 is maintained in a fast, single direction flow which, when it impacts the turbine, impacts all of the blades of the turbine. This, and other measures, improve the mass flow rate over the blades of the turbine and aid in obtaining efficient power from the turbine.

The turbine 20 may be of any design and construction required. It will be seen that the turbine is at, or just above, ground level and therefore can be made easily accessible for maintenance. The turbine, of course, has moving parts, but as these are internal to both the column 12 and the inner pipe 18, noise from the turbine can be kept low.

As set out above, the fact that the wind on entering the wind directing structure 14 travels along a constricted passageway accelerates it. Furthermore, it is intended that air flowing through the structure 14 will cause useful drag within the wind directing structure 14 to induce air flow. Theoretically, it is expected that, given an average wind speed of 5 ms, the air flowing into the hollow inner pipe 18 can be given a speed greater than 300 ms.

Figure 5A:
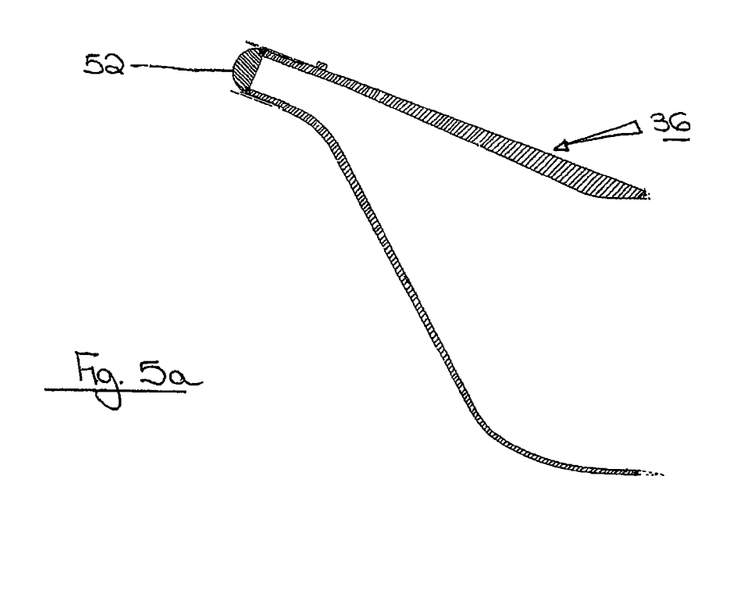
FIG. 5a shows a vertical section through a funnel of a fluid directing structure provided with a flap.
Figure 5B:
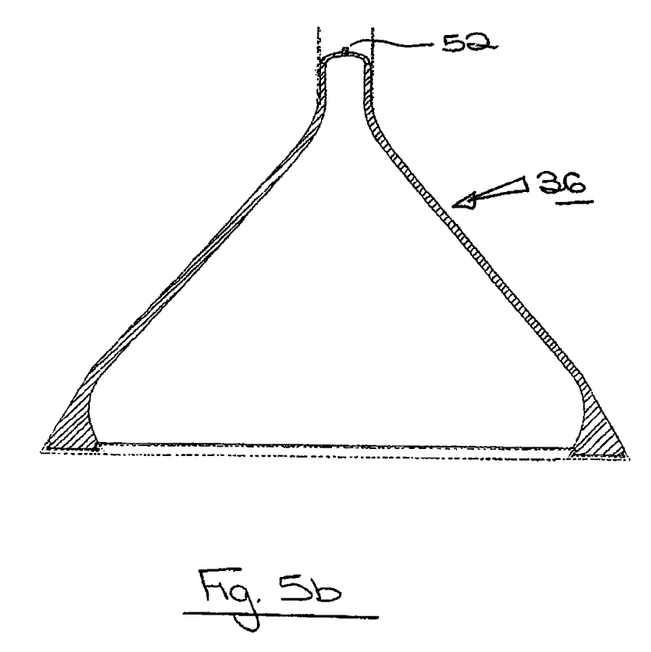

FIGS. 5*a* and 5*b* show the shape of one embodiment of a funnel 36. This has been designed not only to encourage air flow within the funnel but also to provide an outer curved shape along which the exhaust air has to flow to create drag under the funnel. Thus, the widened mouth opening 38 of the funnel aids in gathering wind into the funnel. The funnel shape should, preferably, be optimised to allow for easy air flow through the funnel and easy exit from the outlet 40.

It will be seen that in the embodiment of FIGS. 5*a* and 5*b* a wind flap 52 is provided at the outlet 40. This is a lightweight flap which opens and allows air to pass when wind is flowing into a funnel 36. The funnel is shaped, and/or the outlet pipe 42 is shaped so that the flaps 52 are generally closed by gravity. Thus, when the wind changes direction the flap 52 closes. The closed flaps of all of the funnels in the wind directing structure 14 which are not receiving the incoming wind ensure that the air exits the structure along the outside bottom surfaces of the funnels 36 and not through the funnels themselves.

The funnels 36 are to be constructed from tough but lightweight material. It is likely that they will be moulded and, therefore, made of a plastics material or fibreglass.

The main column 12, the inner pipe 18, and the outlet pipes 42 are preferably made of steel. Whilst the outlet pipes 42 would generally have a circular cross-section of the same diameter throughout, it will be seen that both of the column 12 and the inner pipe 18 have an initial cylindrical section and then a converging section. In the case of the inner pipe 18 there is only a small convergent section and the inner pipe is thereafter cylindrical for the rest of its length. By contrast the main column 12 has a cylindrical section which defines the turbine chamber 16, and then converges upwardly to its top. It will be appreciated that this convergence of the main column 12 produces a constriction for the exiting air towards the top of the column 12 which acts to speed up the air being exhausted and assists in pulling the air out of the column.

The component parts of the wind turbine and its method of construction as well as the material from which the individual components are made can be chosen as required. It is presently envisaged that the main components will be made in sections and connected by steel rods. In this respect, a rod 54 supporting the roof of the frame 22 is illustrated in FIG. 2. If required, solar panels may be supported on the roof 50.

It has been noted that there are gaps 28 in the frame 22 of the wind directing structure 14 through which exhaust air exits. Rather than providing grilles 29 across the gaps 28, one-way flaps 56, which can be seen in FIG. 4*b*, may be provided at these gaps 28 to ensure that air cannot flow into the structure through such gaps. In FIG. 4*b*, the closed flaps 56 face into the wind flow, whilst at the opposite side of the structure 14, the exit gaps 28 are open for air to exit.

The plate 30 which extends beneath the frame 32 acts as an air flow stabiliser. It prevents updrafts and air being dragged from beneath the wind directing structure 14 and entering the structure 14. The plate 30 ensures that there is a lateral and consistent flow of air through the structure 14, under the funnels 36, whereby the drag D is created. As will be seen from FIG. 4*a*, for example, the plate 30 extends beyond the frame 22. The position of the air flow stabiliser plate 30 can be chosen to give optimum control of the air flow and to minimise interference with the drag. In some configurations, the stabiliser plate 30 may completely close the gap beneath the funnels.

It will be appreciated that, as compared to the commonplace wind generators, the wind turbine described and illustrated has many advantages. It has an increased operational time as it never needs to be adjusted to face the wind. It should be operational at much lower external wind speeds. The structure on the top of the column generally requires no maintenance and maintenance of the rotatable turbine 20 and other parts should be considerably easier as access is easy. The generation of electricity is by the turbine which is enclosed for both safety and noise reduction. The lack of external blades should also enhance safety for birds.

Figure 6:
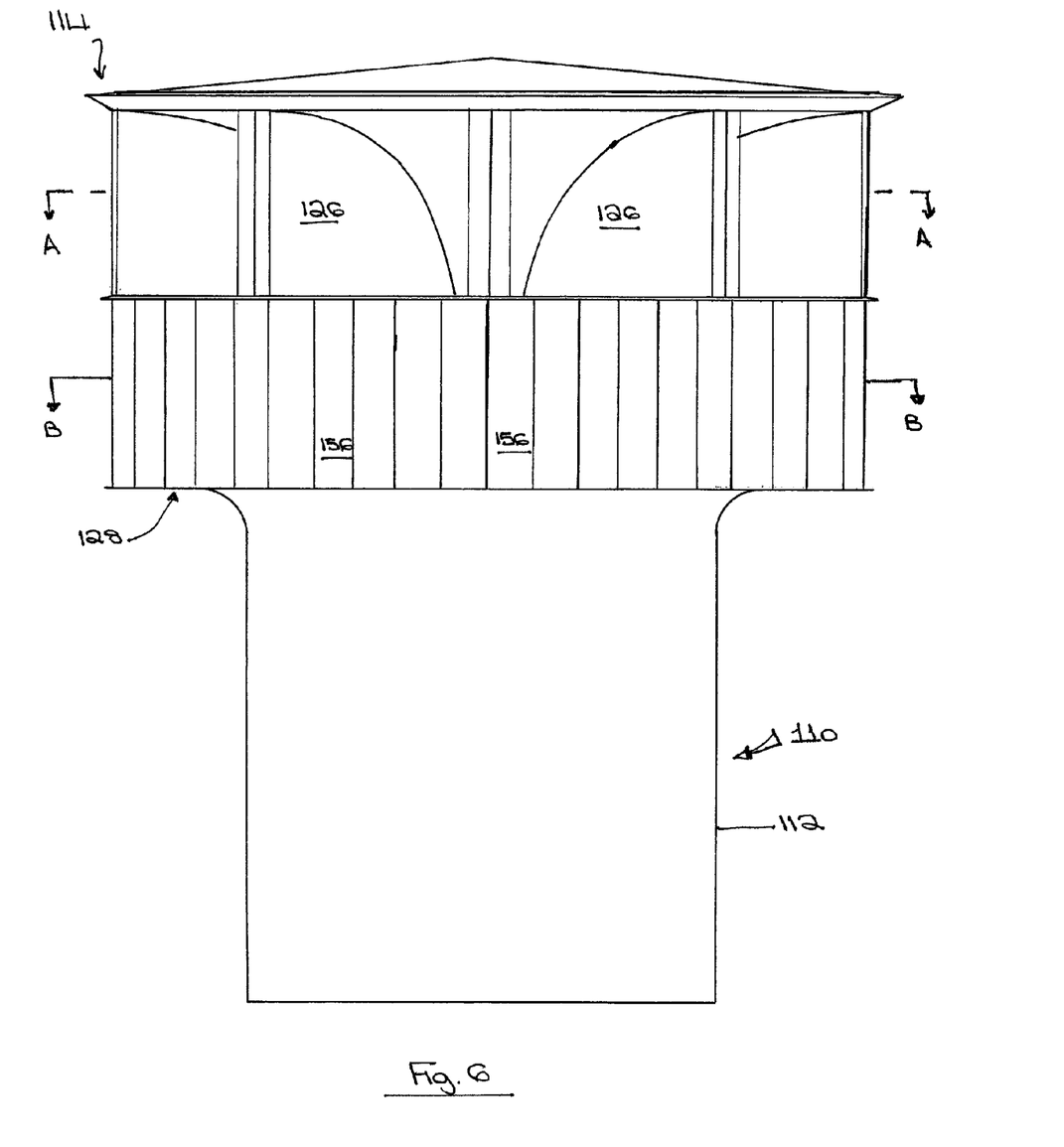
FIG. 6 shows schematically a perspective view of a wind turbine in accordance with a second embodiment of the invention.

FIG. 6 shows an alternative embodiment of a wind turbine of the present invention. The wind turbine 110 of FIG. 6 has an upstanding hollow pipe 112 forming a column which carries a wind directing structure 114. A turbine chamber is formed within the column.

As compared to the first embodiment, the wind directing structure 114 has two parts. There is a first part having a plurality of inlet openings 126 spaced around the periphery thereof and there is a second, lower part having a plurality of exit openings 128 each closed by an appropriate flap 156.

Figure 7:
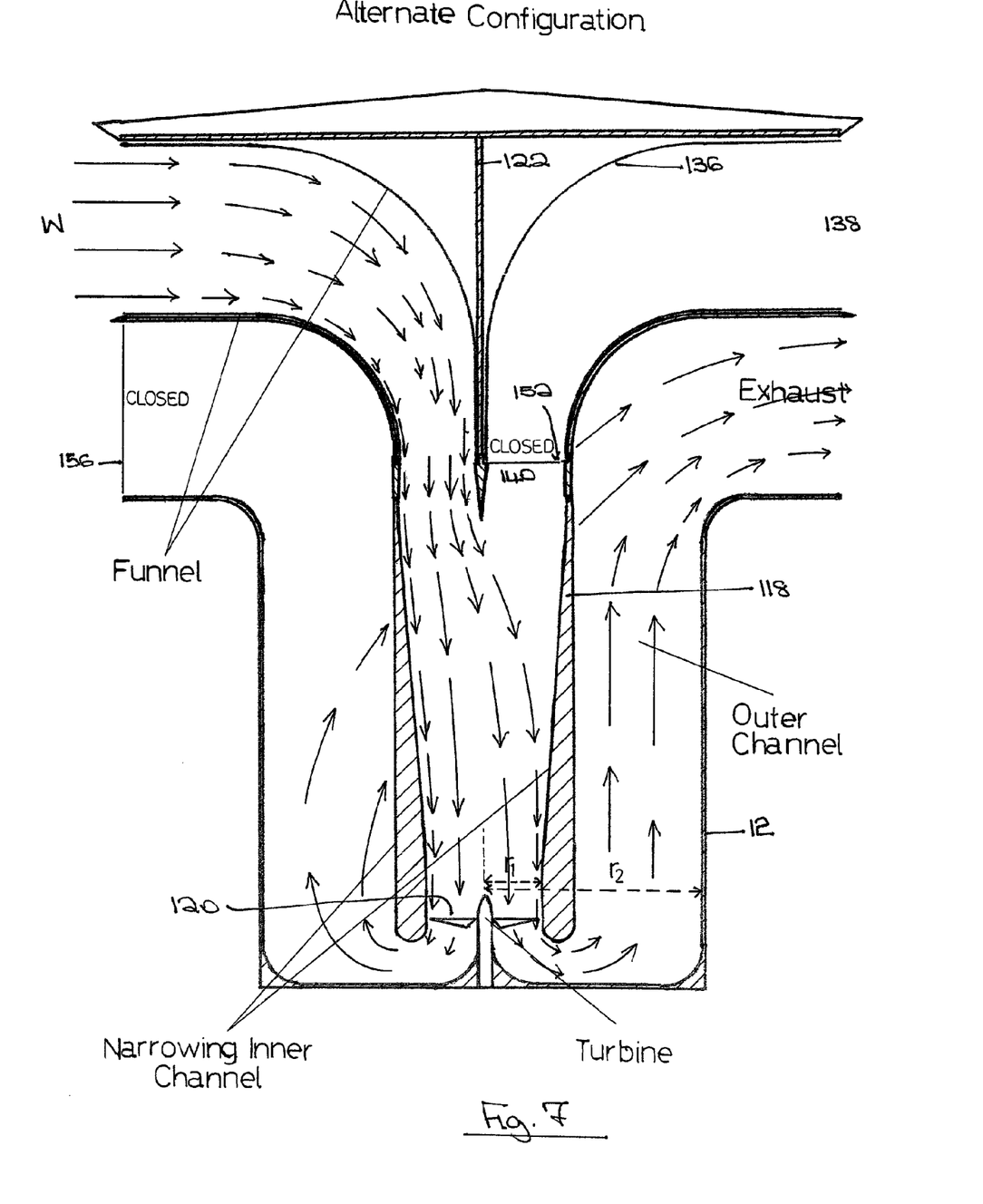
FIG. 7 shows a vertical section through the wind turbine of FIG. 6.

As is apparent from FIGS. 6 and 7, in this alternative embodiment, funnels 136 extend around the periphery of a frame 122. The frame with its inlet openings 126 is arranged above an extension of the frame supporting the exit openings 128.

As shown in FIG. 7, the frame 122 houses six funnels 136 each having a mouth opening 138 and each constricting to an outlet 140. The outlets communicate with an interior hollow pipe 118 which extends within the column 112. In this embodiment, the hollow pipe 118 is shaped so that its diameter decreases as the pipe extends from top to bottom. This further exploits the venturi effect to increase the speed of the air flow within the hollow pipe 118 and increase the kinetic energy available for a turbine 120, which is mounted within the lower, constricted area of the inner pipe 118.

As shown on FIG. 7, at its lower end the inner pipe 118 has the radius r1 whilst the column 112 has the radius r2. The area of the inner pipe 118 at the lower level, defined by radius r1, is A1 whilst the area of the column 112 at that level, defined by radius r2, is A2. For efficiency from the turbine and to obtain an increased mass flow rate through the turbine for the wind the following relationship should be maintained:

$$A2-A1>A1.$$

As can be seen in FIG. 7 a flap 152 is provided in the outlet 140 of each funnel 136. Generally these flaps 152 cannot be opened by wind and suction forces, or gravity, and will therefore be powered to their open and closed positions. As noted above, each exit outlet 128 is closed by an appropriate flap 156.

FIG. 7 shows the situation which would appertain when the wind is flowing generally in the direction W. The flap 152 of funnels to receive the wind is opened so that wind flows from one or more inlet openings 138 and flowing into the inner pipe 118 are combined together and impinge the turbine 120. The flaps 156 on the exhaust openings 128, generally on the opposite side of the wind directing structure 114, are opened so that the wind flows through the structure as illustrated in FIG. 7.

The flaps 156 are opened and closed by wind pressure. The oncoming wind forces flaps 156 facing the wind to close. Each flap 156 is mechanically connected (not shown) to a diametrically opposite flap 156. As a flap on one side is closed by the wind, the opposed and connected flap is opened by the force of the closing flap assisted by lower pressure being generated proximate to the opening flap.

If preferred, the mechanical connection between flaps can be omitted, and flaps can be opened by the generation of the lower pressure.

Figure 8A:
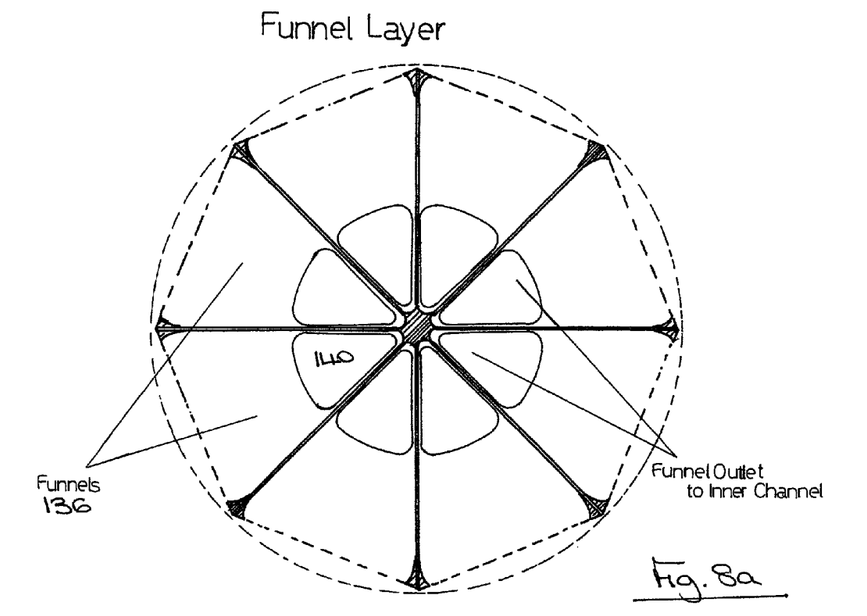
FIG. 8a shows a cross-section through the fluid directing structure of the wind turbine of FIG. 6 taken at line AA of FIG. 6.
Figure 8B:
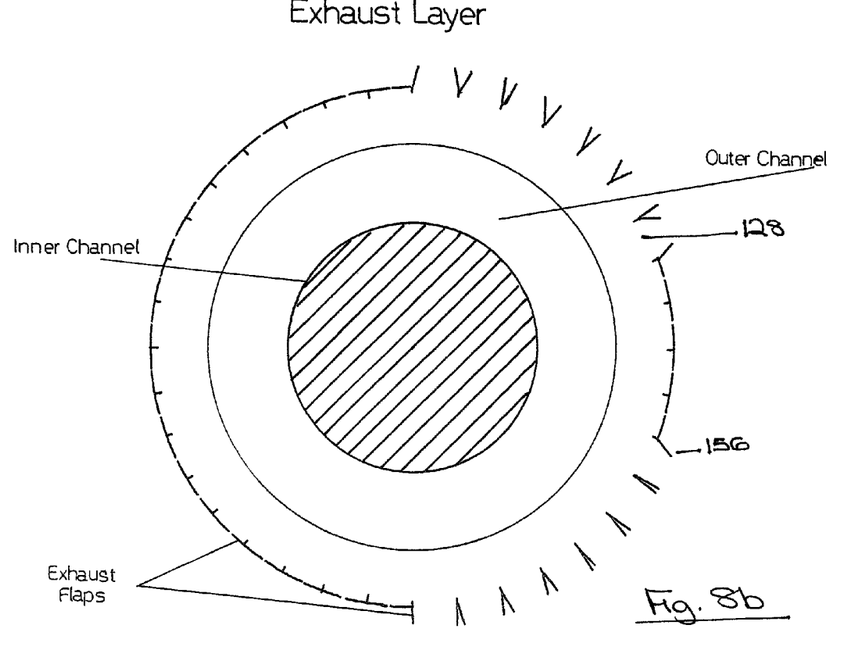
FIG. 8b shows a cross-section taken at line BB of FIG. 6.
Figure 9A:
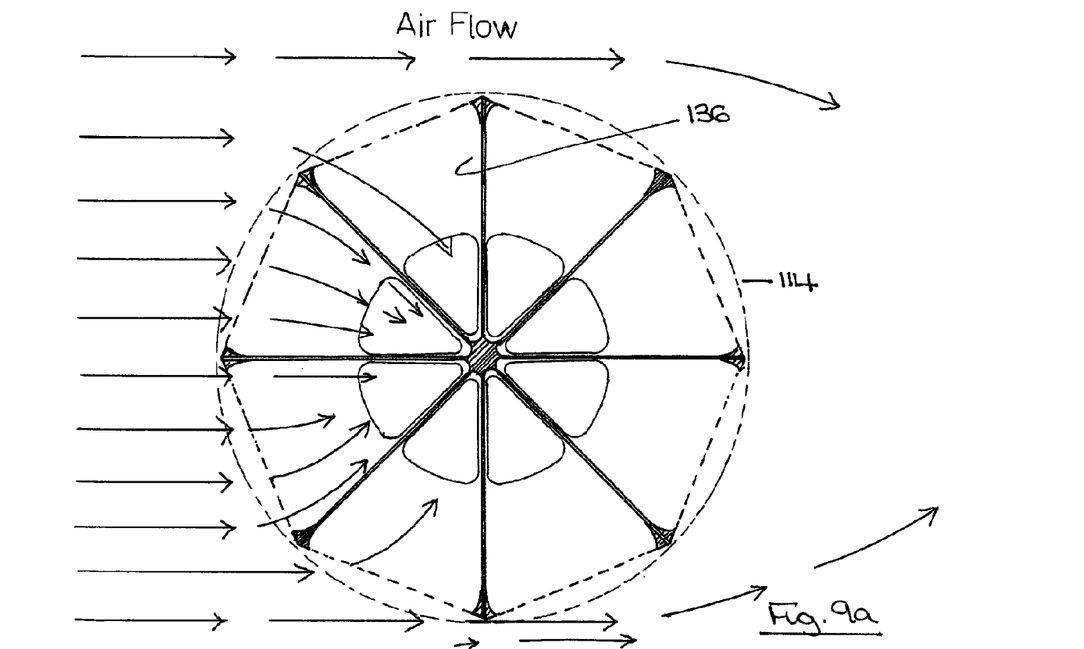
FIG. 9a shows a view similar to FIG. 8a showing wind flow.
Figure 9B:
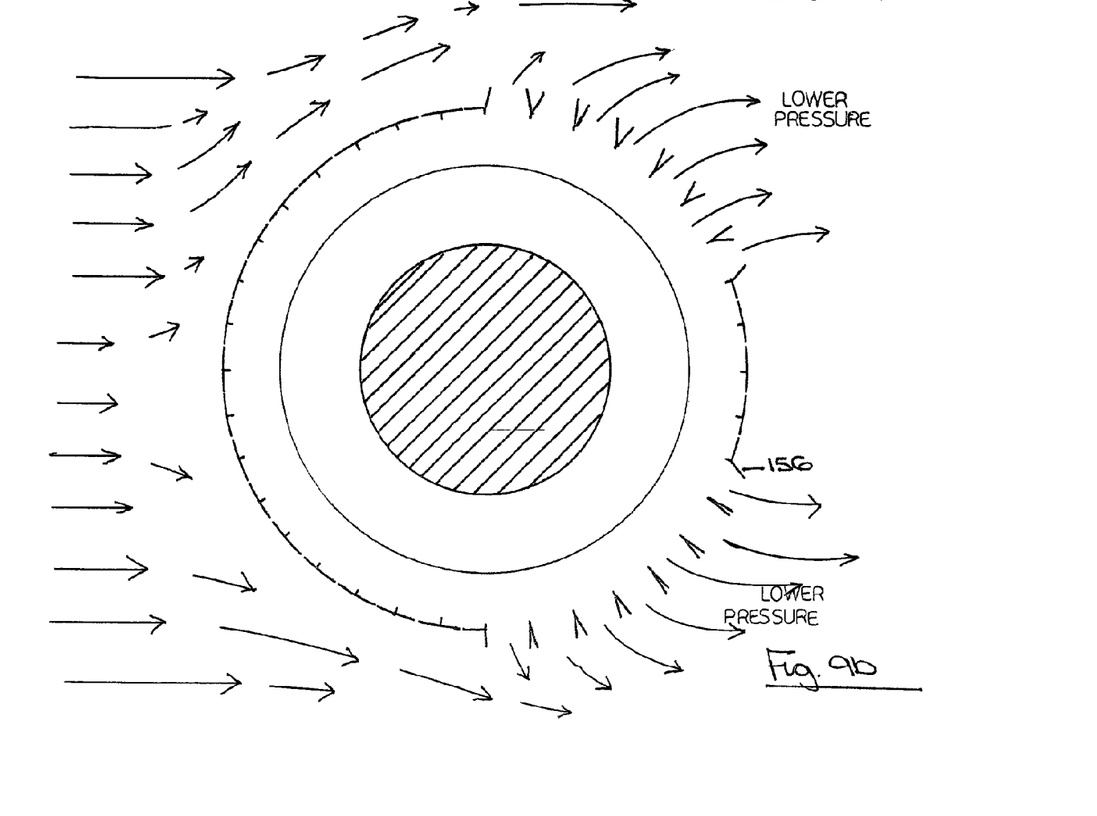
FIG. 9b shows a view similar to FIG. 8b illustrating the wind flow.

FIG. 8a is a cross-section showing the funnels 136 and their outlets 140. FIG. 8b shows the extension of the frame with the exhaust openings 128 and shows the flaps 156 closing those openings. FIGS. 9a and 9b show the same cross-sections but with wind being controlled to flow as indicated in FIG. 7. It will be seen that inflow of wind into the structure 114 will be into two or more funnels 136. Flaps 156 on the opposite side of the structure will be opened but generally there will be a small area on that opposite side where the flaps 156 remain closed. This sets up optimum low pressure areas to obtain a wind flow through the structure 114 which has fast flow speeds and which is constrained to impact on the turbine in a manner to provide efficiency of energy conversion.

It will be appreciated that modifications of and variations to the embodiments as described and illustrated may be made within the scope of this application as defined by the accompanying claims.

The invention claimed is:

1. A fluid powered turbine comprising:
an elongate, hollow pipe,
a rotatable turbine, operable by fluid flow, housed within the hollow pipe at or near a first end thereof, and
a fluid directing structure affixed to the pipe at or near its second end spaced from the first end,
wherein there is at least one fluid flow conduit extending within the pipe and connecting the fluid directing structure with the rotatable turbine such that fluid flow within the directing structure can be directed to the rotatable turbine to operate the rotatable turbine, and
wherein the fluid directing structure has a plurality of individual inlet openings spaced around its periphery, a plurality of outlet openings, and a plurality of funnels, each funnel having an outlet, to direct fluid at each inlet opening to an outlet opening in communication with said fluid flow conduit,
wherein there is provided a powered flap at the outlet of one or more funnels of the plurality of funnels to control the flow of fluid therethrough, and
wherein the plurality of outlet openings have flaps to be selectively opened or closed in use by fluid pressure.

2. A fluid powered turbine structure as claimed in claim 1, wherein the hollow pipe is in the form of an upstanding hollow column and the rotatable turbine is housed within the column.

3. A fluid powered turbine structure as claimed in claim 2, wherein the rotatable turbine is a vertical axis turbine with generally horizontally extending blades and is housed within the hollow column.

4. A fluid powered turbine structure as claimed in claim 1, wherein the rotatable turbine incorporates a generator for generating electricity.

5. A fluid powered turbine as claimed in claim 1, wherein the funnels of the plurality of funnels are spaced around the fluid directing structure and each has a mouth forming a respective inlet opening, wherein a respective outlet pipe is attached to each funnel, the outlet of each outlet pipe communicating with said fluid flow conduit, and wherein said fluid flow conduit is an inner, hollow pipe extending within the elongate hollow pipe generally coaxially therewith.

6. A fluid powered turbine as claimed in claim 1, wherein the fluid directing structure is arranged to draw fluid into the fluid flow conduit and to increase the speed of the fluid directed to the rotatable turbine.

7. A fluid powered turbine as claimed in claim 6, wherein the fluid directed to the rotatable turbine is constrained to flow within the pipe back towards the fluid directing structure after exiting the turbine and then to exit the fluid directing structure, the exiting of the fluid from the turbine being arranged to increase the mass flow rate of the fluid.

8. A fluid powered turbine as claimed in claim 1, wherein the fluid directing structure comprises a housing having a plurality of individual inlet openings spaced around its periphery, and a plurality of inlet structures each extending between a respective inlet opening and a fluid outlet, wherein each inlet structure is constricted in cross sectional area as it extends away from the inlet opening.

9. A fluid powered turbine as claimed in claim 8, wherein each inlet structure is a funnel with its mouth forming the inlet opening, and wherein a respective outlet pipe is attached to the outlet of each funnel.

10. A fluid powered turbine as claimed in claim 9, wherein all of the outlet pipes of all of the funnels are adjacent and substantially parallel.

11. A fluid powered turbine as claimed in claim 10, wherein a movable flap is attached to each funnel at or near its outlet.

12. A fluid powered turbine as claimed in claim 11, wherein the arrangement is such that each movable flap generally closes the respective outlet under the force of gravity, or other powered method.

13. A fluid powered turbine as claimed in claim 8, wherein the housing comprises a frame formed to define the inlet openings, the frame having a roof carried thereby, the roof being shaped to direct air flow.

14. A fluid powered turbine as claimed in claim 13, wherein solar panels are carried by said roof.

15. A fluid powered turbine as claimed in claim 13, wherein the frame comprises a top and a bottom joined by upstanding struts, wherein pairs of adjacent struts define an inlet opening there between.

\* \* \* \* \*